United States Patent Office 3,458,319
Patented July 29, 1969

3,458,319
PROCESS FOR PREPAIRING PRELIGHTENED
INSTANT COFFEE COMPOSITIONS
Harry W. Block, East Orange, N.J., and Neal Henshall,
Oakdale, N.Y., assignors to General Foods Corporation, White Plains, N.Y., a corporation of Delaware
No Drawing. Filed Jan. 12, 1966, Ser. No. 520,053
Int. Cl. A23f 1/08
U.S. Cl. 99—71          4 Claims

ABSTRACT OF THE DISCLOSURE

Powdered prelightened instant coffee compositions comprising soluble coffee admixed with a non-dairy lightener, that is, a non-dairy cream substitute for use with coffee. Several processes for making the compositions are described.

This invention relates to an improved coffee product and more particularly to a prelightened instant coffee product.

At present there is available on the market several different coffee powders from which a cup of coffee can be made by mixing about a teaspoon of the coffee powder with a cup of boiling water. In using any of these mixes, however, a coffee drinker who is accustomed to using cream with his coffee must add the cream separately. Alternatively, if he desires, he can use one of several non-dairy coffee lighteners which are sold to the public. But in either case he must keep on hand not only the powdered coffee but also the cream or cream substitute.

Attempts have been made to prepare a prelightened dry coffee mixture but the resulting products had an inferior flavor and did not dissolve easily when added to hot water. The present invention overcomes these difficulties in that it provides a process for preparing a prelightened powdered coffee which has excellent flavor and aroma and is readily soluble in hot water.

It is, therefore, an object of the present invention to provide a process for preparing a prelightened powdered coffee, that is, a powdered coffee that contains a non-dairy cream substitute.

It is another object of the invention to provide a prelightened powdered coffee having excellent flavor and aroma.

It is a further object of the instant invention to provide a prelightened powdered coffee which dissolves instantly in water.

These and other objects of the invention will be obvious from the following description and examples thereof.

According to one embodiment of the present invention a dried non-dairy coffee lightener is blended thoroughly with a predetermined amount of finely ground instant powdered coffee. The coffee-lightener mixture is then agglomerated to produce a product having improved solubility in water. In the agglomeration step the bulk particle size of the coffee-lightener mix is increased, thereby rendering the dry mix more soluble in water. The dispersibility of the dry coffee-lightener mixture can be improved by tempering it for a period of about one hour at about 0° F. prior to the agglomeration. The tempering step permits the product to equilibrate moisture-wise. After agglomeration, the product can be finished by sieving through an 8 mesh screen.

In the preferred embodiment of the instant invention a liquid non-dairy coffee lightener containing about 20% solids is blended with a coffee extract or percolate in a weight ratio of about 1 to about 4 parts of coffee lightener solids per part of coffee solids. Th coffee-lightener blend is then dried. The drying can be conducted by any suitable method but is preferably done by the spray drying technique. If desired, the dried coffee-lightener coffee mixture can be tempered and agglomerated as taught above.

One advantage of the present invention is that both th non-dairy coffee lightener and the coffee are subject to only one drying step therefore valuable flavor components are not lost due to repeated and excessive heating steps. Another advantage is that there is less danger of producing an off-color product caused by carmelization of the lightener due to excessive and repeated heating.

The coffee lightener used in the examples of this invention has the following formulation:

| Formula ingredient: | Percent by wt. |
|---|---|
| Water | 79.543 |
| Frodex (24DE corn syrup solids) | 10.153 |
| Vegetable fat (Wecobee FW)[1] | 6.473 |
| Sodium caseinate | 2.158 |
| Sodium tripolyphosphate | 0.305 |
| Gums (stabilizer 603)[1] | 0.403 |
| Sorbitan monostearate (Drewtan 60)[1] | 0.303 |
| Dipotassium phosphate | 0.253 |
| Polyoxyethylene (20) sorbitan monosterate (Drewpone 60)[1] | 0.101 |
| Milk flavor (10X) | 0.101 |
| Beta carotene | 0.007 |

[1] Supplied by Drew Chemical Corp., Boonton, N.J.

In the above formulation the sodium tripolyphosphate is added to control the pH of the lightener. The sorbitan monostearate and polyoxyethylene (20) sorbitan monostearate act as emulsifiers. The beta carotene is incorporated as a color. It is to be understood that the above formulation is not critical as to concentrations or ingredients and the constituents may be varied to suit various coffee products. When using a freshly prepared liquid coffee lightener to make the product of the instant invention it may be preferable to cool it to below 100° F. prior to drying to prevent the loss of volatile coffee aroma ingredients when the lightener is added to the coffee extract.

The following examples are given as illustrative of the present invention without, however, limiting the same to the specific details of the examples.

Example I 9 lbs. of coffee percolate containing 3 lbs. of coffee solids was added to 45 lbs. of liquid coffee lightener containing 9.2 lbs. of solids at 100° F. After thorough mixing, the solution was rapidly cooled to 40° F. and spray dried. After the drying step, the powdered mixture was chilled for one hour at 0° F. and agglomerated in a Blaw-Knox steam agglomerator. The agglomerator mixture was permitted to dry at room temperature conditions and then tempered a second time for at least one hour at 0° F. Afterwards it was served through an 8 mesh screen. 8.5 gms. of the dried coffee-lightener mix was added to 160 mls. of hot water. The resulting coffee solution had a pleasant taste and a golden color. The solution had a pH of 6.2.

Example 2

Enough coffee ligh*ener was spray-dried to yield 2.1 lb. of dry powder. 1.73 lbs. of instant soluble coffee was pre-ground in an Alpine mill. The ground instant soluble coffee was blended with the dried coffee lightener and the blended mixture was agglomerated in a Blaw-Knox steam agglomerator and dried at room temperature conditions. The dry agglomerants were tempered for one hour at 0° F. and sieved through an 8 mesh screen. 8.5 gms. of dried coffee lightener mixture was added to 160 mls. of hot water. The resulting solution has a pleasant taste and a golden color. The pH of the solution was 6.3.

Although we have mentioned only coffee in the specification and the claims the same process may be used for prelightening certain other beverages such as tea and decaffeinated coffee, and we wish to have understood that our claims may include such other beverages as may be treated by the process and composition as per the invention.

What is claimed is:

1. A process for preparing a powdered prelightened coffee composition comprising
   (a) blending a liquid non-dairy lightener containing from 1–4 parts of solids with coffee percolate containing 1 part of coffee solids.
   (b) spray drying the non-dairy lightener/coffee mixture,
   (c) conditioning the dried non-dairy lightener/coffee mixture at about 0° F. for about 1 hour,
   (d) agglomerating the conditioned dried non-dairy lightener/coffee mixture,
   (e) drying the agglomerated non-dairy/lightener coffee mixture at room temperature conditions, and
   (f) tempering the dried agglomerated non-dairy lightener/coffee mixture for about one hour at about 0° F.

2. A process according to claim 1 wherein the liquid non-dairy lightener/coffee percolate mixture is rapidly cooled to about 40° F. before being spray dried.

3. A process according to claim 1 wherein the ratio of lightener solids to coffee solids is 3 to 1.

4. A process for preparing a powdered prelightened coffee composition comprising
   (a) blending a liquid non-dairy lightener containing from 1–4 parts of solids with 1 part of powdered soluble coffee solids,
   (b) spray drying the non-dairy lightener/coffee mixture,
   (c) conditioning the dried non-dairy lightener/coffee mixture at about 0° F. for about 1 hour,
   (d) agglomerating the conditioned dried non-dairy lightener/coffee mixture,
   (e) drying the agglomerated non-dairy/lightener coffee mixture at room temperature conditions, and
   (f) tempering the dried agglomerated non-dairy lightener/coffee mixture for about one hour at about 0° F.

References Cited

UNITED STATES PATENTS

| | | | |
|---|---|---|---|
| 2,913,342 | 11/1959 | Cameron et al. | 99—123 |
| 3,227,558 | 1/1966 | Richmond | 99—71 |
| 2,431,496 | 11/1947 | Nadelson et al. | 99—71 |
| 2,564,332 | 8/1951 | Kellogg | 99—71 |

MAURICE W. GREENSTEIN, Primary Examiner

U.S. Cl. X.R.

99—56, 63, 199